US009061362B2

(12) United States Patent
Nohmi

(10) Patent No.: US 9,061,362 B2
(45) Date of Patent: Jun. 23, 2015

(54) PIPE ASSEMBLING DEVICE

(75) Inventor: Kenji Nohmi, Kitakyushu, Fukuoka (JP)

(73) Assignee: PLUS ONE TECHNO CO., LTD., Kitakyushu-Shi, Fukuoka (JP)

(*) Notice: Subject to any disclaimer, the term of this patent is extended or adjusted under 35 U.S.C. 154(b) by 0 days.

(21) Appl. No.: 13/522,955

(22) PCT Filed: Dec. 7, 2010

(86) PCT No.: PCT/JP2010/007124
§ 371 (c)(1), (2), (4) Date: Jul. 18, 2012

(87) PCT Pub. No.: WO2011/089672
PCT Pub. Date: Jul. 28, 2011

(65) Prior Publication Data

US 2012/0324688 A1 Dec. 27, 2012

(30) Foreign Application Priority Data

Jan. 19, 2010 (JP) ................................ 2010-009494

(51) Int. Cl.

| | |
|---|---|
| ***B23P 19/04*** | (2006.01) |
| ***B23Q 39/02*** | (2006.01) |
| ***B23P 21/00*** | (2006.01) |
| ***B23Q 15/00*** | (2006.01) |
| ***B23K 26/00*** | (2014.01) |
| ***B23K 9/028*** | (2006.01) |
| ***B23K 9/167*** | (2006.01) |
| ***B23K 37/04*** | (2006.01) |
| ***B23P 19/00*** | (2006.01) |
| *B23K 37/053* | (2006.01) |

(52) U.S. Cl.
CPC ........... *B23K 9/0288* (2013.01); *Y10T 29/5367* (2015.01); *B23K 9/167* (2013.01); *B23K 37/0452* (2013.01); *B23K 37/0536* (2013.01); *B23K 2201/06* (2013.01); *B23K 2201/10* (2013.01); *B23P 19/00* (2013.01)

(58) Field of Classification Search
USPC ................ 29/237, 466, 720, 60; 219/121.64, 219/125.1
See application file for complete search history.

(56) References Cited

U.S. PATENT DOCUMENTS 3,775,986 A * 12/1973 Daughtry ..................... 405/169
4,041,720 A * 8/1977 Lebourg ....................... 405/170

(Continued)

FOREIGN PATENT DOCUMENTS

| | | | |
|---|---|---|---|
| JP | 52-63129 | A | 5/1977 |
| JP | 9-5006 | A | 1/1997 |
| JP | 2000-5875 | A | 1/2000 |

*Primary Examiner* — Lee D Wilson
*Assistant Examiner* — Alvin Grant
(74) *Attorney, Agent, or Firm* — patenttm.us

(57) ABSTRACT

A simple, compact, lightweight, and inexpensive pipe assembling device (1) for welding and affixing connection flanges (3, 4) to both ends of a connection pipe (2) with high reproducible accuracy on the basis of electronic data for manufacturing design pipes, the connection pipe (2) comprising a straight pipe or a bent pipe for conveying fluid such as gas or running water. The pipe assembling device comprises a pair of left and right, the first and second flange positioning mechanisms (5, 6), at least one of which can move on a horizontal plane so as to approach and separate from each other in the direction in which the pair is separated from each other. The flange positioning mechanisms comprise: flange placement bases (7, 8) which are provided with X-direction slide mechanism (10) for sliding the flanges in the X-direction with the flanges affixed; θ1-direction rotation mechanism (11) which rotate the flange placement bases in a plane; θ2-direction rotation mechanism (12) which rotate the θ1-direction rotation mechanism in the vertical direction; and θ3-direction rotation mechanism (13) which rotate the θ2-direction rotation mechanism in the horizontal direction.

5 Claims, 3 Drawing Sheets

(56) References Cited

U.S. PATENT DOCUMENTS 4,568,070 A * 2/1986 Severt ............................ 269/60
5,498,849 A * 3/1996 Isshiki et al. ............ 219/121.64
6,312,018 B1 * 11/2001 Martin ........................... 285/39
2002/0005397 A1 * 1/2002 Bong et al. ................ 219/125.1
2006/0041448 A1 * 2/2006 Patterson et al. ................ 705/1

* cited by examiner (a)
(b)
90°
90°
A
A
1
2
3
4
5
6
7
8
9
14
14a
14b
14c 5,6 the first flange positioning mechanism
12
12d
12f
θ2-direction
12c
θ2-direction
M3
12a
12b
θ3-direction
7,8
θ1-direction
3,4
11b
11c
θ1-direction
M1
10a
10
10b
10c
M2
θ3-direction
13b
13
θ3-direction
θ3-direction
θ2-direction
11a
11
13a
13c
X-direction
M4
12e
θ2-direction
12f
13d

PIPE ASSEMBLING DEVICE

FIELD OF THE INVENTION

The present invention relates to a pipe assembling device which decides on the posture of the flange mounting surface for welding and affixing the flanges to both ends of a connection pipe with high reproducible accuracy on basis of electronic data at both ends of a connection pipe to precisely connect straight pipes or bent pipes for conveying fluid such as gas or running water.

BACKGROUND OF THE INVENTION

A large number of pipes with the flanges for which connecting at both ends of a connection pipe are used in conveying of fluids such as gas or running water. These pipes are straight pipes and bent pipes for bent section. The said bent pipes are generally applicable said connection pipes in easy construction.

The attachment method of the connection pipe includes, for example, preparing the connection pipe in a state not to attach the flanges A, B in advance at both ends of the connection pipe with suitable length and suitable curve, and processing the ends of the connection pipe and the flange A, B for attaching the flange A, B fixed by bolts and nuts on the flange C, D of the pipes in the field site. Then, the flange A, B are provisionally welded the ends of the connection pipe, and the connection pipe is temporarily removed from the flange C, D. And the flange A, B are attached by welding both ends of the connection pipe. The production of the connection pipes are carried out in the field site now. And it is the very dangerous work that including the flame cutting, the welding, and the carrying of the heavy load. In addition, as for the finished connection pipe, the precision is not constant, and the quality is considerably rough. In general, a lot of such things are used.

Furthermore, the reproduction device which is easily capable of producing the connection pipes with the flanges based on the working drawing in a factory by systematizing, and which decides on the posture of the flange mounting surface which supports the flanges attached both ends of the connection pipe, and namely the positions and the angles, is disclosed as follows, FIG. 3 is a schematic illustration of the system to use for the posture decision method of the flange mounting surface in a reproduction device according to a conventional art. In FIG. 3, (a) is a figure of indicating the whole constitution, (b) are front elevations of a reproduction device. As shown in (a) of FIG. 3, the NC unit **110*a* which is the computer is connected to the reproduction device 110 having the attitude control system. In the NC unit 110*a*, input device 110*b* to input the necessary dimensions, and the angle data which took out from the working drawing of the connection pipe 188. The manipulator inputs the dimensions and the angle data which took out from the working drawing of the connection pipe 188 into NC unit 110*a* using the input device 110*b*. Further, the NC unit 110*a* sends out the flange posture control signal to the posture control system which is built-in the reproduction device 110**, after having converted these dimensions and these angle data into the posture control signal that is the numerical control signal.

As shown in (b) of FIG. 3, the reproduction device 110 comprise, the pedestal 112 which a plurality of adjust pads 111 are attached to in the lower part, the first installation frame 113 which is rided and fixed on one side of the pedestal 112, the second installation frame 114 which is attached in a movable state on the other side of the pedestal 112, the first and second turning mechanisms which turn the first and second turning bases 115, 116 attached on the first and second installation frames 113, 114, the first and second tilting mechanisms 121, 122 to incline the first and second tilting bases 119, 120 with the tilting mechanism to attached on the first and second turning bases 115, 116, the turntable mechanisms 123, 124 with the turning mechanism attached on the first and second tilting bases 119, 120, the flange installation mechanisms 125, 126 attached on the turntable mechanisms 123, 124 (see Patent Document 1)

[Patent Document 1] Japanese Patent Laid-Open Publication No. 2000-5875

However, in case of which the diameter of the connection pipes are big, or the length of the connection pipes are relatively long, there were the problems that the construction characteristics became bad by the weight of the connection pipe. Further, in the conventional method, there were the troublesome problems that the connection pipes were transported to the field site, the corrections of the connection pipes were processed in the field site, and the installation angle of the flange were necessary to be decided in the field site.

Therefore, using a positioning device described in the Japanese Patent Laid-Open No. H9-5006 that the present inventor had applied before, the position of both the ends of the pipe which be going to join is measured, the model is formed in the factory, the flanges which is going to be connected to the position is located, the flanges are connected, and the connection pipes with the flanges are formed. However, the model of the pipe (as the temporary body) which is going to connect, must be produced; furthermore, because these temporary flanges and pipes are not usable depending on the setting place, the model might not be used.

In view of the above problems, it is an object of the present invention to provide a pipe assembling device, in which the pipe assembling device reproduces the pipe with the flange based on the working data of the design pipe, is simple, compact, lightweight, and inexpensive.

SUMMARY OF THE INVENTION

A pipe assembling device 1 according to a first aspect of the present invention is a device for which welding and affixing with high reproducible accuracy on the basis of electronic data the connection flanges 3, 4 to both ends of the connection pipe 2, to connect a straight pipe or a bent pipe for conveying fluid such as gas or running water. the said Pipe Assembling Device comprises: a pair of left and right, the first and second flange positioning mechanism 5, 6, at least one of which can move on a horizontal plane so as to approach or separate from each other. The said flange positioning mechanisms 5, 6 comprise, the flange placement bases 7, 8 with the X-direction slide mechanism 10 to slide along X-direction the flange 3, 4, in case of defining as the X-direction the direction that the flange linearly slides, the θ1-direction turning mechanism 11 to planarly turns to the θ1-direction the flange placement bases 7, 8, in case of defining as the said θ1-direction the direction that planarly turns around the flange axis that is perpendicular for the surface of the flange, the θ2-direction turning mechanism 12 to vertically turns to the θ2-direction the θ1-direction turning mechanism 11, in case of defining as the θ2-direction the direction that turns around the support axis of the θ1-direction turning mechanism 11 the flange axis, the θ3-direction turning mechanism to turns to the θ3-direction the θ2-direction turning mechanism, in case of defining as the θ3-direction the direction that turns integrally on a horizontal plane the mechanism that turns to the X-direction, the θ1-direction, and the θ2-direction. Also, the connection pipe 2 includes the curve pipe having at least one flexuosity and the straight pipe.

According to a first aspect of the present invention, the pipe assembling device which comprises a pair of left and right, the first and second flange positioning mechanisms 5, 6, at least one of which can move on a horizontal plane so as to approach or separate from each other, can easily regulate for the length of the various pipes, can reproduce the connection pipe with the flange based on the working data of the design pipe, and is simple, compact, lightweight, and inexpensive.

A pipe assembling device 1 according to a second aspect of the present invention is a device for which welding and affixing with high reproducible accuracy on the basis of electronic data the connection flanges 3, 4 to both ends of the connection pipe 2, to connect a straight pipe or a bent pipe for conveying fluid such as gas or running water. The said Pipe Assembling Device 1 comprises: a pair of left and right, the movable first flange positioning mechanism 5, and the fixed second flange positioning mechanism 6, which can move on a horizontal plane so as to approach or separate from each other. The said flange positioning mechanisms 5, 6 comprise, the flange placement bases 7, 8 with the X-direction slide mechanism 10 to slide along X-direction the flange 3, 4, the θ1-direction turning mechanism 11 to planarly turns to the θ1-direction the flange placement bases 7, 8, the θ2-direction turning mechanism 12 to vertically turns to the θ2-direction the θ1-direction turning mechanism 11, and the θ3-direction turning mechanism 13 to horizontally turns to the θ3-direction the θ2-direction turning mechanism 12.

According to a second aspect of the present invention, the pipe assembling device can easily reproduce the connection pipe with the flange based on the working data of the design pipe, and is simple, compact, lightweight, and inexpensive.

A pipe assembling device 1 according to a third aspect of the present invention is a device for which welding and affixing with high reproducible accuracy on the basis of electronic data the connection flanges 3, 4 to both ends of the connection pipe 2, to connect a straight pipe or a bent pipe for conveying fluid such as gas or running water, the said Pipe Assembling Device 1 comprises: a pair of left and right, the first and second flange positioning mechanism 5, 6, at least one of which can move on a horizontal plane so as to approach or separate from each other. The said flange positioning mechanisms 5, 6 comprise, the first and second flange placement bases 7, 8 which fix the flange 3, 4, the θ1-direction turning mechanism (11) to planarly turns to the θ1-direction the flange placement bases (7, 8), the θ2-direction turning mechanism (12) to vertically turns to the θ2-direction the θ1-direction turning mechanism (11), and the θ3-direction turning mechanism (13) to horizontally turns to the θ3-direction the θ2-direction turning mechanism (12).

According to a third aspect of the present invention, the pipe assembling device can easily reproduce the connection pipe with the flange based on the working data of the design pipe, and is simple, compact, lightweight, and inexpensive.

According to the present invention, the pipe assembling device can easily regulate for the length of the various pipes, can reproduce the connection pipe with the flange based on the working data of the design pipe, and is simple, compact, lightweight, and inexpensive.

DETAILED DESCRIPTION OF EMBODIMENT

A pipe assembling device according to a embodiment will be described below with reference to the attached drawings.

Figure 1:
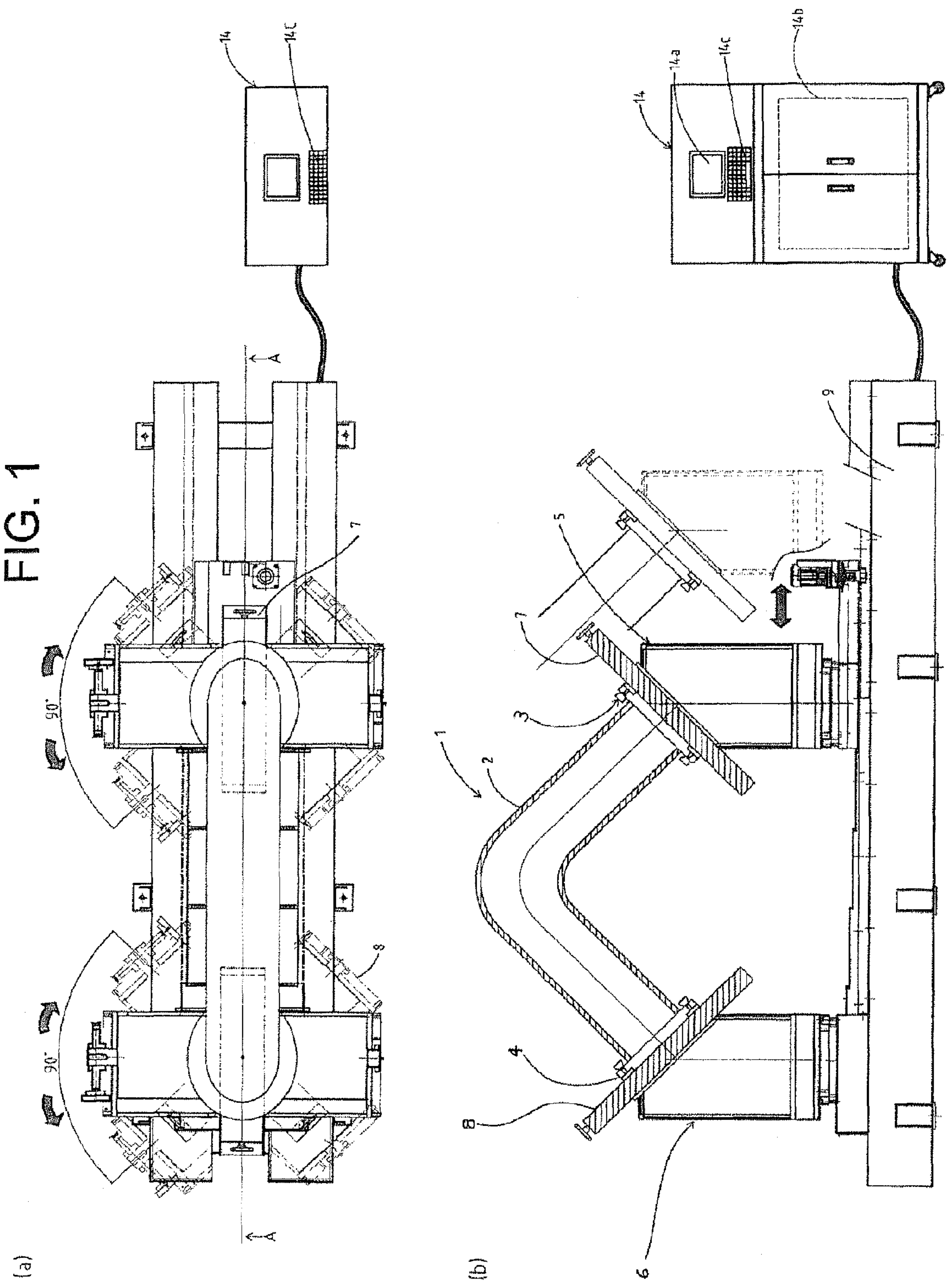
FIG. 1 is a schematic illustration of the pipe assembling device to explain an embodiment of the present invention, and includes (a) and (b), in which (a) is a ground plan of a pipe assembling device, (b) is a front view.

FIG. 1 is a schematic illustration of the pipe assembling device to explain an embodiment of the present invention, and includes (a) and (b), in which (a) is a ground plan of a pipe assembling device, (b) is a front view.

As shown in FIG. 1, the pipe assembling device 1 supports the processes from the assembling of the design pipe to temporary welding. Heretofore, a craftsman produced it on the level block. The small and light pipe assembling device 1 can decide on the posture of the flange mounting surface which supports the flanges attached both ends of the connection pipe based on the working drawing of the connection pipe, namely the positions and the angles, and can produce the connection pipes with the flanges in a factory. The manipulator inputs the working data of the design pipe as the measured result of the relations about the flange surface, and in this way, the right and left seven axes (the 4 axes and the 3 axes) and the setting value of a slide quantity are displayed on the monitor. By matching of these each axis and a slide quantity with the targeted value by the manual operation, the setting of the position is completed and can produce the pipe in a factory.

Namely, the pipe assembling device 1 can weld and affix with high reproducible accuracy on the basis of electronic data the first flange 3 and the second flange 4 to both ends of the straight pipe or the bent pipe for conveying fluid such as gas or running water. The Pipe Assembling Device comprises a pair of left and right, the first flange positioning mechanism 5 and the second flange positioning mechanism 6 of which at least one can move on a horizontal plane so as to approach or separate from each other, and the controller 14 for controlling these mechanism.

The Pipe assembling device 1 of the present embodiment is comprised of a fixed side positioner and a movement side positioner, and the second flange positioning mechanism 6 is a fixation side positioner, and the first flange positioning mechanism 5 is a movement side positioner. The diameter of the application pipe is from 40 A to 200 A, the aspect interval is from 350 mm to 2,000 mm, and the fixation side positioner 6 has three axes constructed from a flange axis, a pivot axis, and a elevation axis. And each axis is accompanied by an encoder (a transmitter) and the encoder precisely transmits each positions to the controller. And the movement side positioner 5 has four axes constructed from a flange axis, a pivot axis, a elevation axis, and a moving axis (a surface separation). And each axis is accompanied by an encoder (a transmitter) and the encoder precisely transmits each positions to the controller. The encoder transmits the data to the controller at an angle of 0.1 degrees, and a distance of 0.1 mm. Furthermore, since the manual steering wheels are set up for each of the drive axes, the manual handles can clamp the drive axes in the manual operation after setting. And because it is possible to attach the motor to the handle axes, all the clamp axes can be driven by electricity.

The Controller 14 is comprised of the display 14*a*, the computer 14*b*, and the keyboard 14*c*. The display 14*a* is set up in the prominent place and displays the characters in the big size for viewability. And the operator puts the positions of each axis while watching the targeted value. The keyboard 14*c* is for which the operators input the information about the pipes. And the information about the pipe to input is eight items as follow. For example, there are the length of L1, L2, L3 which is the basic dimensions of the pipe having two bent sides, the angle of L1 and L2, the twist side N1 (the projection angle on a around plan of L2 and L3), the twist side N2 (the projection angle on a front view of L2 and L3), the hole angle H1 (L1 side), and the hole angle H2 (L3 side).

Figure 2:
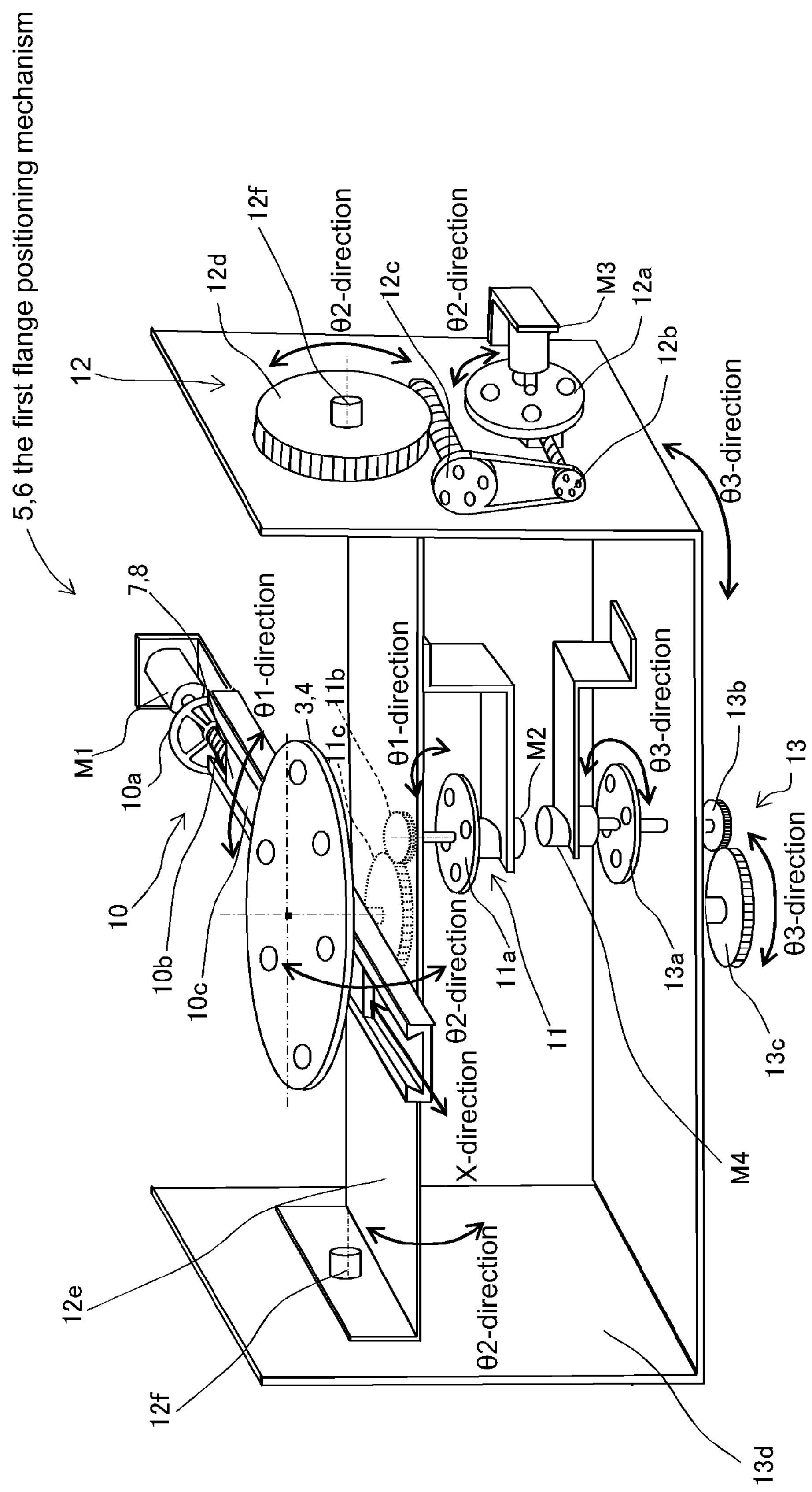
FIG. 2 is a perspective view showing a composition of the flange positioning mechanisms of the present embodiment.
Figure 3A:
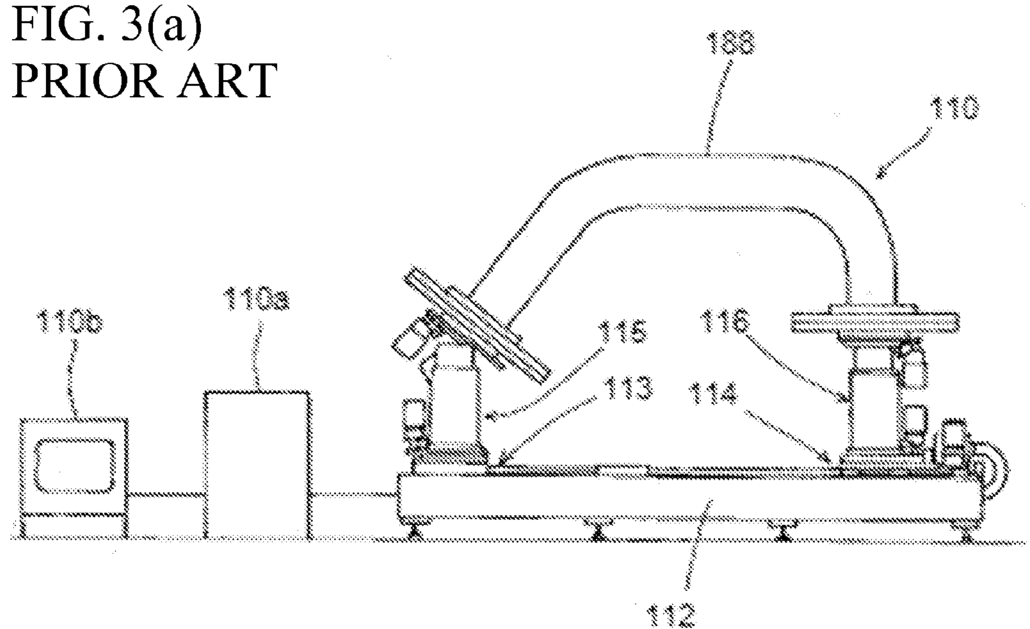
FIG. 3 is a schematic illustration of system using for the posture decision method of the flange mounting surface in a conventional reproduction device, and includes (a) and (b), in which (a) is a component drawing showing the whole, (b) is a front view.
Figure 3B:
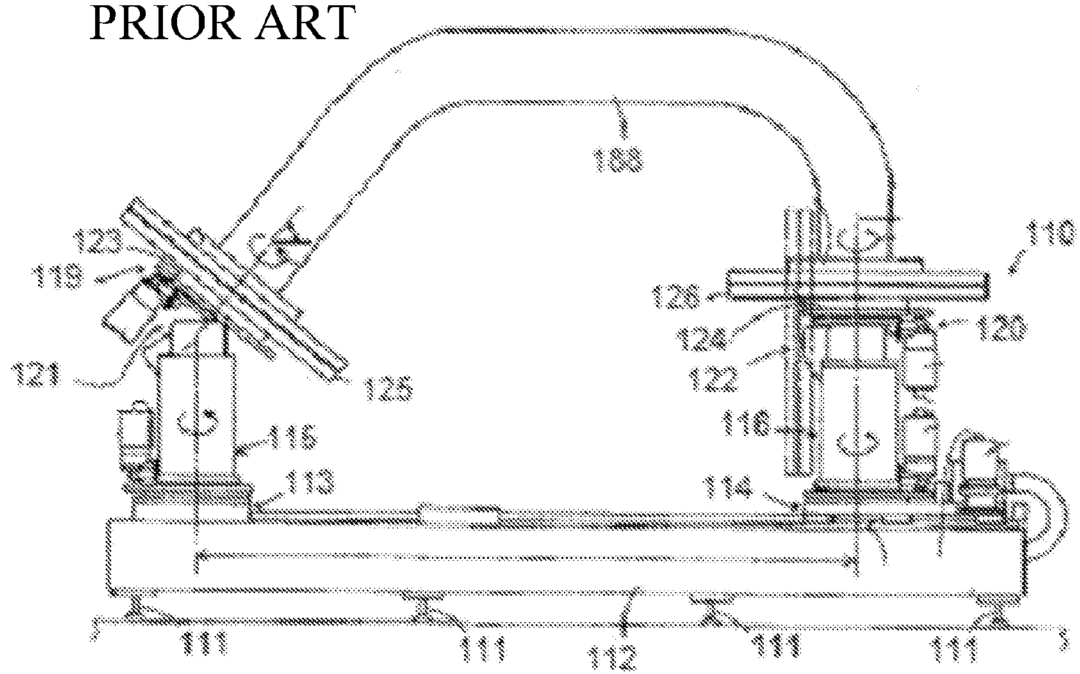

FIG. 2 is a perspective view showing a composition of the flange positioning mechanisms of the present embodiment. As shown in FIG. 2, the first flange positioning mechanism 5 comprise the first flange placement bases 7 with the X-direction slide mechanism 10 to slide along X-direction the first flange 3, the θ1-direction turning mechanism 11 to planarly turns to the θ1-direction the first flange placement bases 7, the θ2-direction turning mechanism 12 to vertically turns to the θ2-direction the θ1-direction turning mechanism 11, and the θ3-direction turning mechanism 13 to horizontally turns to the θ3-direction the θ2-direction turning mechanism 12. In addition, likewise, the second flange positioning mechanism 6 comprise the second flange placement bases 8 with the X-direction slide mechanism 10 to slide along X-direction the second flange 4, the θ1-direction turning mechanism 11 to planarly turns to the θ1-direction the second flange placement bases 8, the θ2-direction turning mechanism 12 to vertically turns to the θ2-direction the θ1-direction turning mechanism 11, and the θ3-direction turning mechanism 13 to horizontally turns to the θ3-direction the θ2-direction turning mechanism 12.

In the one side on the base 9, the second flange positioning mechanism 6 is provided with in a fixed state, and in the other side on the base 9, the first flange positioning mechanism 5 is provided to be able to move on the two parallel linear guides fixed the upper part of the base 9. And the output axis of the first flange positioning mechanism 5 comprises the motor for driving the output axis with the pinion gear. The pinion gear is engaged the rack gear which attached parallel to the side of the linear guide. By driving the motor for driving the output axis, the first flange positioning mechanism 5 can move on a horizontal plane so as to approach or separate from each other for the second flange positioning mechanism 6 located in the fixed state on the base 9.

Then, the posture decision method of the flange mounting surface in the pipe assembling device using the system having the constitution explained above, will be described below. Herein, it is explained about the example of driving electrically the three axes and the one slide mechanism. Of course, the setting is possible in the manual operation easily. As shown in FIG. 1, for example, using the basic dimensions of eight items of the pipe, the positions of the first flange 3 and the second flange 4 are decided by the first flange positioning mechanism 5 and the second flange positioning mechanism 6. The basic dimensions are the length of L1, L2, L3, the angle of L1, L2, the twist side N1 (the projection angle on a ground plan of L2 and L3), the twist side N2 (the projection angle on a front view of L2 and L3), the hole angle H1 (L1 side), and the hole angle H2 (L3 side) which are the basic dimensions of the pipe having the two bent parts input by the keyboard 14*c*. In addition, the distance between the fixed second flange positioning mechanism 6 and the movable first flange positioning mechanism 5 can change by moving so as to approach or separate the movable first flange positioning mechanism 5 for the fixed second flange positioning mechanism 6. And the positions of the movable first flange positioning mechanism 5 are able to detect by the encoder, and are controlled by the controller 14.

As shown in FIG. 1, the position of the X-direction of the first flange 3 rided and fixed on the flange placement bases 7 which is attached on the movable first flange positioning mechanism 5 is decided by the X-direction slide mechanism 10 which is driven by the motor M1 provided on the first flange placement bases 7. In addition, the θ1-direction rotation mechanism 11 is provided on the back side of X-direction slide mechanism 10, is driven for turning by the motor M2, and turns to the θ1-direction by transmitting the turning motion to the small gear 11*b* and the large gear 11*c*. Hereby, the first flange 3 is positioned. Furthermore, the θ2-direction rotation mechanism 12 is supported by the axis to the right and left direction of the θ1-direction rotation mechanism 11, is driven by the motor M3, and hereby turns to the θ2-direction by being transmitted to the small pulley 12*b*, the large pulley 12*c*, and the gear 12*d*. Hereby, the first flange 3 is positioned.

Furthermore, the θ3-direction rotation mechanism 13 is provided so as to support the θ2-direction rotation mechanism 12, is driven by the motor M4, and hereby turns to the θ3-direction by being transmitted to the small gear 13*b*, and the large gear 13*c*. Hereby, the first flange 3 is positioned. In addition, because the handles 10*a*, 11*a*, 12*a*, and 13*a* is attached to each the rotor axes of the motor M1, M2, M3, and M4, it is possible to operate by the manual operation. Hereby, the first flange 3 is positioned to the any space by controlling the three axes and one slide mechanism. In addition, the position of the X-direction of the second flange 4 rided and fixed on the flange placement bases 8 which is attached on the fixed second flange positioning mechanism 6 is decided by the X-direction slide mechanism 10 which is driven by the motor M1 provided on the second flange placement bases 8. In addition, the θ1-direction rotation mechanism 11 is provided on the back side of X-direction slide mechanism 10, is driven for turning by the motor M2, and turns to the θ1-direction by transmitting the turning motion to the small gear 11*b* and the large gear 11*c*. Hereby, the second flange 4 is positioned.

Furthermore, the θ2-direction rotation mechanism 12 is driven to the rotative direction by the motor 3 which is supported by the axis to the right and left direction of the θ1-direction rotation mechanism 11, and hereby turns to the θ2-direction by being transmitted to the small pulley 12*b*, the large pulley 12*c*, and the gear 12*d*. Hereby, the second flange 4 is positioned. Furthermore, the θ3-direction rotation mechanism 13 is provided so as to support the θ2-direction rotation mechanism 12, is driven to the rotative direction by the motor M4, and hereby turns to the θ3-direction by being transmitted to the small gear 13*b*, and the large gear 13*c*. Hereby, the second flange 4 is positioned. In addition, because the handles 10*a*, 11*a*, 12*a*, and 13*a* is attached to each the rotor axes of the motor M1, M2, M3, and M4, it is possible to operate by the manual operation. Hereby, the second flange 4 is positioned to the any space by controlling the three axes and one slide mechanism. The connection pipe 2 is located at the position of the first flange 3 and the second flange 4 by the crane. When the connection pipe is small, it is able to attach by the manual operation. After this, the flanges were welded with the connection pipe. The noiseless TIG welder is used for welding, which the high frequencyless welder of a touch start type or the high voltage start type is used. And the D-class grounding is independently laid down.

The production of the connection pipes are carried out in the field site now. And it is the very dangerous work that including flame cutting, welding, and carrying the heavy load. In addition, as for the finished connection pipe, the precision is not constant, and the quality is considerably rough. The merits by introducing this device are, 1) It is possible to decrease sharply the leak from the pipes in the ship after the completion, 2) It is possible to get the assurance of the good quality, 3) It is possible to produce in the factory the work (including flame cutting, welding, and carrying the heavy load in the field), and production is all possible in a factory, 4) If the leak from the pipes occurs in the foreign countries, it is possible to produce the conformity pipes and send it on the next day, 5) A work man-hour is largely decreased, 6) The subsidiary materials to use the temporary body are not necessary. In this case, 3,000 pipes are necessary since usually 300 pipes per one ship are necessary. And when the angle (L−50*50*6) to be used well generally are used as the subsidiary materials, it are necessary 3 pieces of the subsidiary materials for supporting the pipes, it are necessary 6 pieces of the subsidiary materials for fixed the flanges in the factory, and are necessary 9 the subsidiary materials for producing one model of the pipe as the temporary body in total. Therefore, the 27,000 (9×3,000) pieces of subsidiary materials are necessary for ten ships. In case of which the average length of the angles is 0.4 m, the angles are necessary the length of 10,800 m (0.4 m×27,000 pieces), and are the weight of 54 ton (5 kg/m×10,800 m). Hereby, those is not necessary. Therefore, 27,000 pieces and 54 ton of the scrap materials become needless. And As the material cost are 100 yen/kg, the material cost approximately decreases 5,400,000 yen, and the cost for cutting and welding of 27,000 pieces is not necessary. (as those do not include the overhead costs such as gas, the welding rods or etc, those become the considerable fee.) 7) As the indirect merits, Gas for cutting and the welding rods are unnecessary for 27,000 pieces, and therefore the transportation by the cars from the field sites to the factories disappears. And as transporting 20 pieces per once, the round trips of 1,350 times by the cars were necessary, however, those become needless.

Furthermore, as the effect by using this pipe assembling device, 1) it is possible to reduce the personnel expense as not need the technique for the work, 2) it is possible to reduce the defective articles as the alteration such as the hole angle, 3) it is possible to reduce the working hour by the Improvement (improvement of the productivity) of the work efficiency, 4) it is possible to manage the production management data as outputting on the printer the data of the day. In addition, in the safety, the environment, the quality, and the cost, for the safety, there are 1) the work environment improvement, 2) the air environment improvement, 3) the facilities environment improvement. For the work environment improvement, because getting rid of on the high-place work and the welding work, it is effective from the viewpoints of the disaster prevention. For the air environment improvement, because getting rid of the welding work in the field, and being possible to decrease the harmful thing revelation, it is effective to contribute to the air environment improvement in the fields. For the facilities environment improvement, because carrying out the risk assessment of the various work and the machinery, it is effective to contribute to the prevention of the outbreak such as the serious disasters.

Then, for the environment, the production of the pipe assembling device according to the present invention realizes the decrease of the waste product in all domains of the conventional work. And in the late years that the environmental problem becomes hot topics, the pipe assembling device is suitable for the environmental energy problem and the social environmental protection by being aware of the environmental regulations and getting rid of the on-site welding work.

In addition, for the quality, 1) in the measurement quality, because the position relations between both the flanges are formed with the digital data by the computer of the measurement device, it is possible to easily manage the quality of the pipe and the information. 2) in the quality of the pipe, the information needed for the pipe production is minutely calculated by using the measurement data. And the production of the pipe is easily realized in consideration of the obstacles around the installation of the on-site pipe for measured. In addition, the pipe production of the stable quality without the mistake is possible. Furthermore, the specifications by hoping of the user are possible easily. 3) In the reproduction quality, in case of reproducing the same flange side on the pipe assembling device with the flange side by the on-site measurement data, it is possible to confirm at the first sight on the monitor the state such as the position and the hole having attached the measurement machine.

In the cost, 1) as the almighty cost reduction, because necessary at the time of the conventional model production the unloading works, the movement works and the work floor (the level block) become needless, and the dead work and the cleanup work are reduced. Further, the supporting materials and the drawing figures expense can decrease. 2) As the reduction of the man-hour in all processes, the on-site flange installation, the installation and the disinstallation of the pipe as the temporary body, unloading, loading to the factory, the measurement of the dimensions, the drawing, the working-out of the processing dimensions, and the removal of the die. 3) The cost per one pipe production becomes to reduce 50% of the man-hour in comparison with the method conventionally.

Although the preferable embodiments are described above, the present invention is not limited to the above embodiments but various changes can made without departing from the spirit of the invention. For example, although the Pipe Assembling Device comprises a pair of left and right, the first flange positioning mechanism and the second flange positioning mechanism of which at least one can move on a horizontal plane so as to approach or separate from each other, the mechanism does not mind even the other mechanism. In addition, the constitution of the link transmission including the gear and the pulley does not mind if the flange positioning mechanism is the 4 axis control possibility.

As the availability in the industry, the present invention is applied to a pipe assembling device which decides on the posture of the flange mounting surface for welding and affixing the flanges to both ends of a connection pipe with high reproducible accuracy on basis of electronic data at both ends of a connection pipe to precisely connect straight pipes or bent pipes for conveying fluid such as gas or running water.

What is claimed is:

1. A pipe assembling device for welding and affixing with high reproducible accuracy on the basis of electronic data connection flanges to both ends of a connection pipe, to connect a straight pipe or a bent pipe for conveying a fluid, said pipe assembling device comprising, first and second flange positioning mechanisms, at least one of which can move on a horizontal plane so as to approach or separate said first and second flange positioning mechanisms from each other, said first flange positioning mechanism comprising, a flange placement base having an X-direction slide mechanism to slide a flange along the X-direction, wherein the X-direction comprises the direction parallel to the face of the flange mounting to the placement base that the flange linearly slides, a θ1-direction turning mechanism to planarly turn to a θ1-direction the flange placement base, wherein said θ1-direction is a direction that planarly turns around a flange axis that is perpendicular to a surface of the flange, a θ2-direction turning mechanism to vertically turn to a θ2-direction relative to the θ1-direction turning mechanism, wherein said θ2-direction the is a direction that turns around a support axis of the θ1-direction turning mechanism, and a θ3-direction turning mechanism to horizontally turn the θ2-direction turning mechanism to a θ3-direction, wherein the θ3-direction comprises a direction that turns said x-direction slide mechanism, said θ1-direction turning mechanism and said θ2-direction turning mechanism integrally on a horizontal plane.

2. A pipe assembling device for welding and affixing with high reproducible accuracy on the basis of electronic data a first and a second connection flanges to both ends of a connection pipe, to connect a straight pipe or a bent pipe for conveying fluid, comprising, a movable first flange positioning mechanism, and a fixed second flange positioning mechanism, said first flange positioning mechanism movable on a horizontal plane so as to approach or separate said first and second flange positioning mechanisms from each other, one of said first fixed or second flange positioning mechanisms comprising, a flange placement base with an X-direction slide mechanism to slide a first one of said first or second connection flanges along an X-direction, the X-direction comprising a direction parallel to a face of the flange mounting to the placement base, a θ1-direction turning mechanism to planarly turn to a θ1-direction the flange placement base, a θ2-direction turning mechanism to vertically turn the θ1-direction turning mechanism to a θ2-direction, and a θ3-direction turning mechanism to horizontally turn the θ2-direction turning mechanism to a θ3-direction.

3. A pipe assembling device for welding and affixing with high reproducible accuracy on the basis of electronic data a first and a second connection flange to both ends of a connection pipe to connect a straight pipe or a bent pipe for conveying fluid, said pipe assembling device comprising:

first and second flange positioning mechanisms, at least one of which can move on a horizontal plane so as to approach or separate said first and second flange positioning mechanisms from each other, each of said flange positioning mechanisms comprising, a first flange placement base to which can be fixed the first or second connection flanges, a θ1-direction turning mechanism to planarly turn the flange placement bases to a θ1-direction, a θ2-direction turning mechanism to vertically turn the θ1-direction turning mechanism to the θ2-direction, and a θ3-direction turning mechanism to horizontally turn the θ2-direction turning mechanism to the θ3-direction, and further comprising a first and second X-direction slide mechanism to slide said first and second placement bases along a direction parallel to the face of the flanges mounting to the placement bases along which the flanges linearly slide.

4. The pipe assembling device according to claim 1, wherein said second flange positioning mechanism comprises, a second flange placement base having an X-direction slide mechanism to slide a flange along the X-direction, wherein the X-direction comprises the direction parallel to the face of the flange mounting to the placement base that the flange linearly slides, a second θ1-direction turning mechanism to planarly turn to a θ1-direction the flange placement base, wherein said second θ1-direction is a direction that planarly turns around a flange axis that is perpendicular to a surface of the flange, a second θ2-direction turning mechanism to vertically turn to a θ2-direction relative to the second θ1-direction turning mechanism, wherein said θ2-direction the is a direction that turns around a support axis of the second θ1-direction turning mechanism, and a second θ3-direction turning mechanism to horizontally turn the θ2-direction turning mechanism to a θ3-direction, wherein the second θ3-direction comprises a direction that turns said x-direction slide mechanism, said θ1-direction turning mechanism and said θ2-direction turning mechanism integrally on a horizontal plane.

5. The pipe assembling device according to claim 2, where the other of said first fixed or second flange further comprises a second flange placement base with an X-direction slide mechanism to slide the second of said first or second connection flanges along an X-direction, the X-direction comprising a direction parallel to a face of the flange mounting to the placement base, a second θ1-direction turning mechanism to planarly turn to a θ1-direction the flange placement base, a second θ2-direction turning mechanism to vertically turn the θ1-direction turning mechanism to a θ2-direction, and a second θ3-direction turning mechanism to horizontally turn the θ2-direction turning mechanism to a θ3-direction.

* * * * *